United States Patent
Kim et al.

(10) Patent No.: US 8,639,023 B2
(45) Date of Patent: Jan. 28, 2014

(54) METHOD AND SYSTEM FOR HIERARCHICALLY MATCHING IMAGES OF BUILDINGS, AND COMPUTER-READABLE RECORDING MEDIUM

(75) Inventors: Tae Hoon Kim, Gyeonggi-do (KR); Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/377,935

(22) PCT Filed: Sep. 6, 2010

(86) PCT No.: PCT/KR2010/006048
§ 371 (c)(1),
(2), (4) Date: Dec. 13, 2011

(87) PCT Pub. No.: WO2011/034305
PCT Pub. Date: Mar. 24, 2011

(65) Prior Publication Data
US 2012/0093395 A1    Apr. 19, 2012

(30) Foreign Application Priority Data
Sep. 16, 2009 (KR) .................. 10-2009-0087794

(51) Int. Cl.
G06K 9/46 (2006.01)
G06K 9/00 (2006.01)

(52) U.S. Cl.
USPC ........................................................ 382/154

(58) Field of Classification Search
None
See application file for complete search history.

(56) References Cited

U.S. PATENT DOCUMENTS

| 2006/0221072 A1* | 10/2006 | Se et al. ............... 345/420 |
| 2008/0143727 A1 | 6/2008 | Oh et al. |
| 2008/0279481 A1* | 11/2008 | Ando .................. 382/306 |
| 2009/0237396 A1* | 9/2009 | Venezia et al. ............... 345/419 |

FOREIGN PATENT DOCUMENTS

| KR | 10-2001-0104256 A | 11/2001 |
| KR | 10-2006-0130425 A | 12/2006 |
| KR | 100734678 B1 | 6/2007 |
| KR | 10-2007-0105566 A | 10/2007 |

OTHER PUBLICATIONS

Schindler, et al., Detecting and Matching Repeated Patterns for. Automatic Geo-tagging in Urban Environments, Computer Vision and Pattern Recognition; 2008.

* cited by examiner

*Primary Examiner* — Claire X Wang
*Assistant Examiner* — Thomas A James
(74) *Attorney, Agent, or Firm* — Blakely, Sokoloff, Taylor & Zafman LLP

(57) ABSTRACT

The present invention relates to a method for hierarchically matching a building image. The method includes the steps of: matching a wall of a specific building in the building image inputted as a query with a wall(s) of a building(s) in at least one panoramic image by using a technology of matching a building's shape or repeated pattern; selecting a candidate panoramic image(s) which includes a building(s) recognized to have the same or similar wall to the specific building in the panoramic image(s) as a result of matching its wall with others; matching at least one local region, if containing a recognizable string or figure, in the specific building with local region(s) in the building(s) of the candidate panoramic image(s) by using a technology of recognizing a string or a figure; and determining top n panoramic image(s) as the result of matching the local region.

17 Claims, 5 Drawing Sheets

METHOD AND SYSTEM FOR HIERARCHICALLY MATCHING IMAGES OF BUILDINGS, AND COMPUTER-READABLE RECORDING MEDIUM

CROSS REFERENCE TO RELATED APPLICATIONS

This application is a U.S. National Phase Application of International Application PCT Application No. PCT/KR2010/006048 filed on Sep. 6, 2010, which claims the benefit of priority from Korean Patent Application No. 10-2009-0087794 filed on Sep. 16, 2009. The disclosures of International Application PCT Application No. PCT/KR2010/006048and Korean Patent Application No. 10-2009-0087794 are incorporated herein by reference.

FIELD OF THE INVENTION

The present invention relates to a method, a system and a computer-readable recording medium for hierarchically matching an image of a building(s); and more particularly, to the method, the system and the computer-readable recording medium for retrieving a panoramic image(s) including what is accurately matched with the building(s) included in the image inputted as a query by using the hierarchical matching scheme for (i) matching an outward appearance of the building such as its wall surface and then (ii) matching a local region included in the building, resulting in dramatical increase in a degree of matching accuracy.

BACKGROUND OF THE INVENTION

Recently, due to the wide spread use of the Internet, it has been common to provide geographic information converted to a digital form. Typical examples of digitalized geographic information may include online map services, car navigation systems, etc. As such, one of benefits of the digitalized geographic information is to provide a variety of convenient functions for users through user interfaces capable of allowing the users to retrieve desired geographic information. Further, changes in the geographic information may be easily updated through remote updating services, etc., so that, in the aspect of latest geographic information, such digital data may be predominant over conventional printed materials.

It has been conventionally common for service providers to combine digital maps generated by the addition of simple symbols with search interfaces and then to provide the combined digital maps, but since there are apparent differences between information of areas displayed on the digital map and real information of the areas, it is difficult to identify the real information of the areas from the digital map.

Filed on Nov. 8, 2007 and disclosed on Jun. 19, 2008, as an attempt to solve such a problem, US Laid-Open Publication No. 2008-143727 relates to a technology for providing a panoramic image(s) relating to a certain place such as a bystreet, a road, etc. appearing on the digital map and, if a user selects a specific pixel with an arrow, etc. on the panoramic image, offering data of a different panoramic image(s) corresponding to a place shown at the specific pixel. Accordingly, the user may identify real information of the certain place on the digital map and get another panoramic image which expresses geographic information on the certain place shown on the panoramic image the user is now referring to in more details through a link between panoramic images.

Further, a conventional technology for performing visual search by using a panoramic image(s) has been introduced. According to the technology, by referring to a queried image inputted by a user, it may retrieve an appropriate panoramic image including what is similar to an object included in the queried image among multiple panoramic images and provide the appropriate panoramic image to the user.

According to the conventional technology for performing the visual search by using the panoramic image(s), a digital map service capable of maximizing user convenience is available. More specifically, if a user inputs an image including a building as a query even without knowing an actual location of the building, it is possible to retrieve, and provide for the user, a panoramic image(s) which actually includes the building or its (or their) relevant information.

According to the conventional technology for performing the visual search by using the panoramic image(s), since buildings look similar and most of them have consistently repeated patterns, if an image of a specific building is inputted as a query, the retrieval speed becomes excessively low and it its not easy to retrieve an appropriate panoramic image(s) including what is accurately matched with the specific building.

SUMMARY OF THE INVENTION

It is, therefore, one object of the present invention to solve all the problems mentioned above.

It is another object of the present invention to retrieve and provide a panoramic image(s) which includes an image of an actual building accurately matched with a building included in a queried image by (i) matching their walls and then (ii) matching local regions inside the walls.

It is still another object of the present invention to dramatically increase a degree of matching accuracy by additionally using supplementary information such as color distribution of a signboard in a local area in a specific building, information on other building(s) adjacent to the specific building, and information on a location through GPS (information on a place where a query is inputted).

In accordance with one aspect of the present invention, there is provided a method for hierarchically matching a building image, including the steps of: (a) matching a wall of a specific building in the building image inputted as a query with a wall(s) of a building(s) in at least one panoramic image by using a technology of matching a building's shape or repeated pattern; (b) selecting a candidate panoramic image(s) which includes a building(s) recognized to have the same or similar wall to the specific building in the panoramic image(s) as a result of matching its wall with others; (c) matching at least one local region, if containing a recognizable string or figure, in the specific building with local region(s) in the building(s) of the candidate panoramic image(s) by using a technology of recognizing a string or a figure; and (d) determining top n panoramic image(s) with top n degree(s) of matching accuracy in the candidate panoramic image(s) as the result of matching the local region.

In accordance with another aspect of the present invention, there is provided a system for hierarchically matching a building image, including: a building wall matching part for matching a wall of a specific building in the building image inputted as a query with a wall of a building in at least one panoramic image by using a technology of matching a building's shape or repeated pattern and selecting a candidate panoramic image(s) which includes a building recognized to have the same or similar wall to the specific building in the panoramic image(s) as a result of matching its walls with others; a local region matching part for matching at least one local region, if containing a recognizable string or figure, in the specific building with the local region(s) in the building(s) of the candidate panoramic image(s) by using a technology of recognizing a string or a figure; and a matching result providing part for determining top n panoramic image(s) with top n degree(s) of matching accuracy in the candidate panoramic image(s) as the result of matching the local region.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
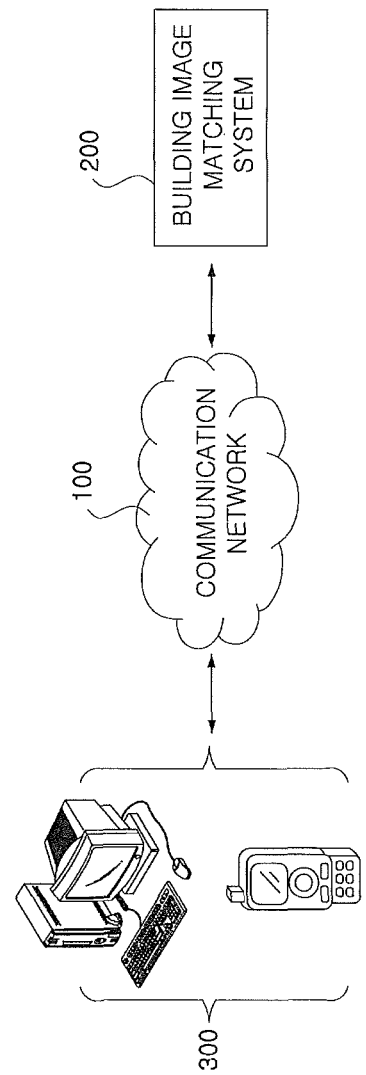
FIG. 1 is a diagram exemplarily illustrating a configuration of an entire system to provide a hierarchical matching service with respect to a building image in accordance with an example embodiment of the present invention.

The detailed description of the present invention illustrates particular embodiments in which the present invention can be performed with reference to the attached drawings.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Herein, a "panoramic image" means an image acquired as a result of photographing a complete view from a certain point and more particularly, a type of the image capable of offering visual information on all directions actually shown at a shooting point three-dimensionally and realistically by expressing pixels constructing the image on a virtual celestial sphere whose center is the shooting point according to spherical coordinates. Further, the panoramic image may be an image expressing the pixels constructing the image according to cylindrical coordinates.

In addition, a "building" is collectively referred to as a structure built on the ground or the like by humans because such a form is required or space offered by such a structure is needed for a certain period of time and it must be understood that a structure appearing on the panoramic image may be employed as the building in the present invention.

Configuration of Entire System

FIG. 1 is a diagram exemplarily illustrating a configuration of an entire system to provide a hierarchical matching service with respect to a building image in accordance with an example embodiment of the present invention.

As illustrated in FIG. 1, the entire system in accordance with an example embodiment of the present invention may include a communication network 100, a building image matching system 200 which provides a hierarchical matching service with respect to a building image, and a user terminal 300.

First of all, the communication network 100 may be configured, regardless of wired or wireless, in a variety of networks, including a local area network (LAN), a metropolitan area network (MAN), a wide area network (WAN), etc. More preferably, the communication network 100 in the present invention may be the World Wide Web (www)

In order to provide a visual search service to the user terminal 300 by using a panoramic image(s), the building image matching system 200 in accordance with an example embodiment of the present invention may perform a function of receiving a building image from the user terminal 300, retrieving a panoramic image(s) including what is same as or similar to a specific building included in the received building image and providing the user with the retrieved panoramic image(s) or its (or their) relevant information. The detailed explanation on an internal configuration of the building image matching system 200 will be made later.

Moreover, a user terminal 300 in accordance with an example embodiment of the present invention may be a digital device which includes a function to enable the user to access to the building image matching system 200 and then communicate with the system 200. Herein, the digital device, such as a personal computer (e.g., desktop, laptop, etc.), a workstation, a PDA, a web pad, a cellular phone, which has a memory means and a micro processor with a calculation ability, may be adopted as the user terminal 300 in accordance with the present invention.

Configuration of Building Image Matching System

Below is a detailed explanation on an internal configuration and components of the building image matching system 200 which perform their important functions for implementing the present invention.

Figure 2:
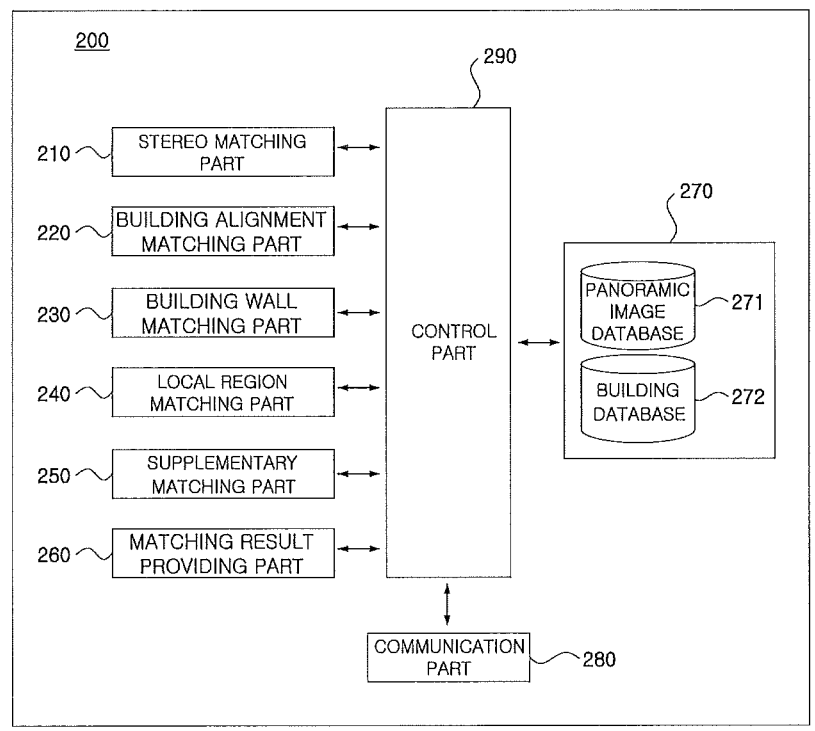
FIG. 2 is a diagram exemplarily showing an internal configuration of a building image matching system in accordance with an example embodiment of the present invention.

FIG. 2 exemplarily represents the internal configuration of the building image matching system 200 in accordance with an example embodiment of the present invention.

By referring to FIG. 2, the building image matching system 200 in accordance with an example embodiment of the present invention may include a stereo matching part 210, a building alignment matching part 220, a building wall matching part 230, a local region matching part 240, a supplementary matching part 250, a matching result providing part 260, a database managing part 270, a communication part 280 and a control part 290. In accordance with an example embodiment of the present invention, at least some of the stereo matching part 210, the building alignment matching part 220, the building wall matching part 230, the local region matching part 240, the supplementary matching part 250, the matching result providing part 260, the database managing part 270, the communication part 280 and the control part 290 may be program modules communicating with the user terminal 300. The program modules may be included in the building image matching system 200 in a form of an operating system, an application program module and other program modules and may also be stored on several memory devices physically. Furthermore, the program modules may be stored on remote memory devices communicable to the building image matching system 200. The program modules may include but not be subject to a routine, a subroutine, a program, an object, a component, and a data structure for executing a specific operation or a type of specific abstract data that will be described in accordance with the present invention.

First, the stereo matching part 210 in accordance with an example embodiment of the present invention may perform a function of applying a stereo matching technology to more than two panoramic images, including respective images of a same building shot in respective different views, which are selected among multiple panoramic images stored in a panoramic image database 271.

Herein, the stereo matching technology is a technology for reconstructing a three-dimensional object from several photos shot in different views by using an image-based modeling scheme. Recently, the stereo matching technology is widely used in the industries of communications, broadcasting, medicine, gaming, display, and the like. In accordance with an example embodiment of the present invention, more accurate and more rapid search may be allowed by using the stereo matching technology.

To do this, the stereo matching part 210 may allow information on the three-dimensionally reconstructed building acquired as a result of the stereo matching technology to be available at the time when various matching processes, e.g., matching for alignments of buildings by the building alignment matching part 220, matching for walls of buildings by the building wall matching part 230, and matching for local regions including signboards, etc. in the buildings by the local region matching part 240, are performed.

In accordance with an example embodiment, all or some buildings appearing on the multiple panoramic images may be reconstructed by the stereo matching technology and the reconstructed buildings may be pre-stored on a building database 272. In short, since various subjects, such as a tree, a vehicle and a human, other than the building may be included on the panoramic images, if buildings included in the multiple panoramic images are three-dimensionally pre-reconstructed and information on the three-dimensionally pre-reconstructed buildings is recorded onto a database, the matching result will be provided more rapidly in response to a queried image of a building.

Of course, in an example embodiment of the present invention, the method for matching a building by referring to the information on the three-dimensionally reconstructed buildings has been mentioned, but it is not limited only to this and it will be able to reproduce the present invention by applying various examples.

If a specific building in the building image inputted as a query is adjacent to at least one another building, the building alignment matching part 220 in accordance with an example embodiment of the present invention may perform a function of determining whether a distance between the specific building and the at least one adjacent building is less than a certain distance or not.

As well, if the distance between the specific building and the at least one building adjacent thereto is determined to be less than the certain distance, the building alignment matching part 220 in accordance with an example embodiment of the present invention may designate the specific building and the at least one building adjacent thereto as a specific building group and recognize the alignment of the buildings included in the specific building group. For example, if the specific building in the queried image is determined to be adjacent to buildings on the right thereof and the left thereof, the building alignment matching part 220 may designate the adjacent buildings to be included in the specific building group and thereby recognize the specific building group to have three aligned buildings.

Moreover, the building alignment matching part 220 in accordance with an example embodiment of the present invention may perform a matching process by comparing whether the alignments of buildings pertaining to the specific building group coincide with those of buildings pertaining to pre-stored respective groups of the respective buildings included in the multiple panoramic images (or the building images) stored in the panoramic image database 271 (or the building database 272). Herein, the pre-stored respective groups represent respective groups of adjacent buildings if the adjacent buildings are located within the certain distance in the panoramic image.

Figure 3:
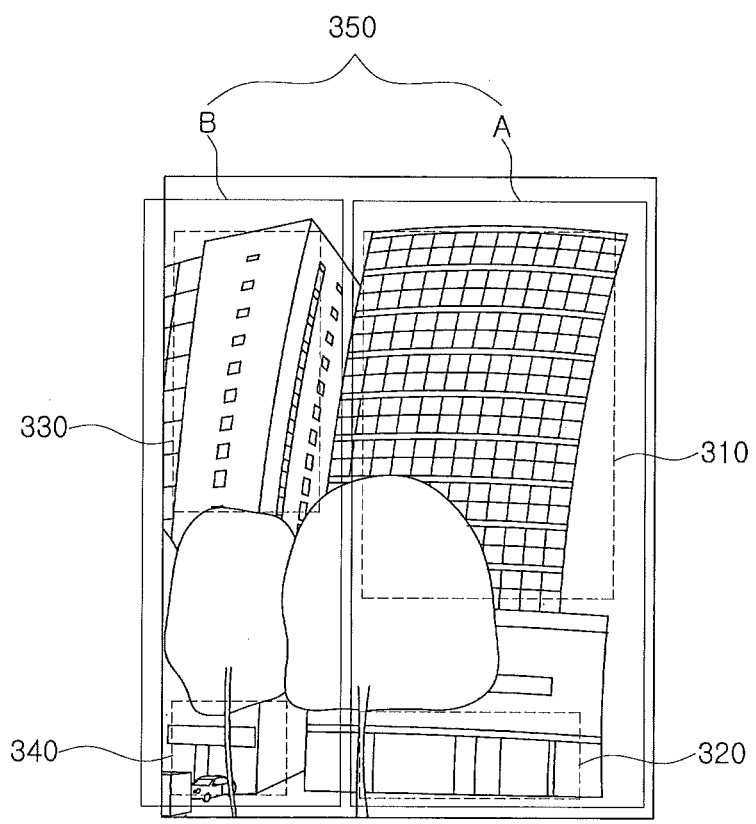
FIG. 3 is a drawing representing the building image (i.e., the queried image) in accordance with an example embodiment of the present invention.
Figure 4A:
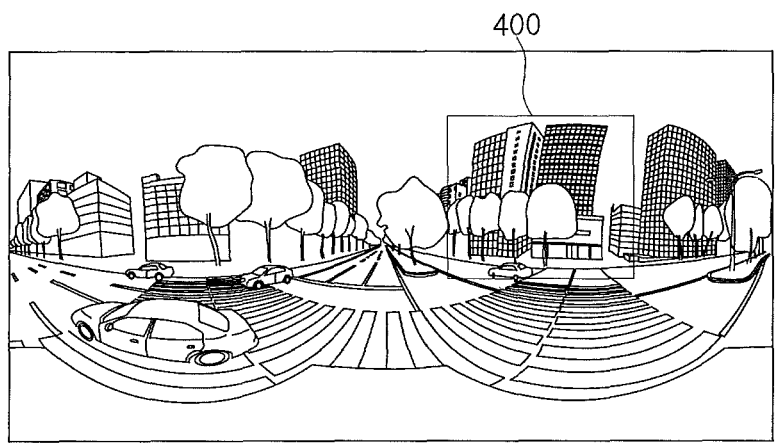
FIG. 4A shows a panoramic image stored in a database in accordance with an example embodiment of the present invention.
Figure 4B:
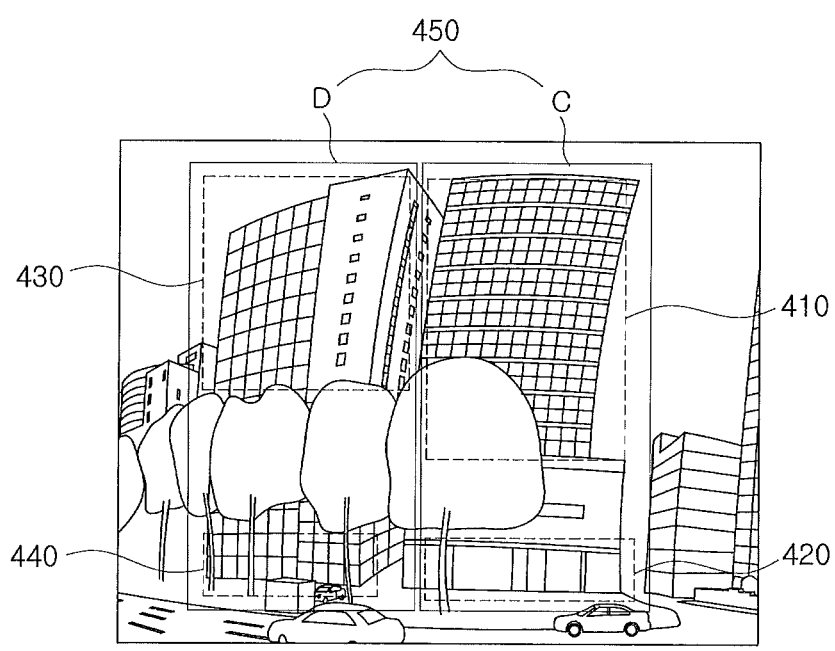
FIG. 4B is a drawing illustrating the enlargement of only a part which is a subject of matching in the panoramic image.

FIG. 3 is a building image (a queried image) in accordance with an example embodiment of the present invention while FIG. 4A is a panoramic image stored in the panoramic image database 271 in accordance with an example embodiment of the present invention and FIG. 4B shows the enlargement of a part 400 which is the subject for matching in the panoramic image of FIG. 4A.

By referring to FIG. 3, the building alignment matching part 220 may determine whether a distance between two buildings A and B in the queried image is less than the certain distance or not. For reference, it is assumed in FIG. 3 that the distance between the two buildings A and B is less than the certain distance, and therefore, the building alignment matching part 220 may designate a set of the two buildings A and B as a group 350 of the buildings.

Since the building alignment matching part 220 may retrieve an appropriate panoramic image(s) (e.g., the panoramic image in FIG. 4) which includes what are same as, or similar to, the alignments of buildings A and B in the group 350 by referring to data on buildings stored in the panoramic image database 271 or the building database 272 and provide the retrieved panoramic image(s) as a candidate panoramic image(s) to the building wall matching part 230, it may allow the building wall matching part 230 to perform a next retrieval process at a higher speed. Herein, the building alignment matching part 220 may determine whether the distance between the two buildings are less than the certain distance by referring to the three-dimensionally reconstructed information on the two buildings and recognize actual alignments of the two buildings based on the result of the determination. If this process is extended to all the buildings included in all the panoramic images, the actual alignments of all the buildings may be derived and thereby the convenient retrieval service may be provided by using the derived alignments.

Next, the building wall matching part 230 in accordance with an example embodiment of the present invention may perform a matching process for checking whether the wall of the specific building in the queried image is matched with walls of respective buildings in the panoramic images. Herein, the panoramic images as the subjects of matching process performed by the building wall matching part 230 may be panoramic images of which noise (i.e, an inappropriate panoramic image) is once filtered out by the building alignment matching part 220, but it is not limited only to this and may be panoramic images acquired directly from the database without going through the building alignment matching part 220.

Matching for the wall of the building referred to in the present invention may be considered as matching an overall form of the building or a generally repeated pattern therein. For example, the matching process for the wall of the building means that for at least one of the following parameters: the building's boundary, the wall's shape, form and color, the wall's window alignment, number of its windows and the like.

More concretely, the building wall matching part 230 may be implemented by using a variety of technologies for recognizing objects. For example, a technology such as "Detecting and matching repeated patterns for automatic geo-tagging in urban environments," an article authored by G. Schindler, etc. and published in Computer Vision and Pattern Recognition in 2008 may be adopted (The whole content of the article may be considered to have been combined herein) but they may not be limited to this.

By referring to FIGS. 3 and. 4B, the building wall matching part 230 in accordance with an example embodiment of the present invention may perform a function of matching a wall region 310 of the building A in the queried image with a wall region 410 of a building C in a panoramic image 400. Herein, the building C corresponds to the building A. As a result of performing the matching, if the wall region 310 of the building A in the queried image of FIG. 3 is identical or similar to the wall region 410 of the building C in the panoramic image 400 of FIG. 4B, the building wall matching part 230 may be able to determine the panoramic image 400 (and other appropriate panoramic images, if any) as a candidate panoramic image(s) and deliver the information on the candidate panoramic image(s) to the local region matching part 240. Herein, the number of candidate panoramic image(s) which goes through the building wall matching part 230 may be less than the number of that (or those) through the building alignment matching part 220.

Next, the local region matching part 240 in accordance with an example embodiment of the present invention may be implemented by using a variety of technologies for recognizing objects and may perform a function of determining a local region of the specific building in the queried image and also a local region(s) of a building image(s) in the candidate panoramic image(s) (i.e., an image(s) of a building(s) whose wall has been matched by the building wall matching part 230) and then matching between the former and the latter local regions.

In accordance with the present invention, the local region may be defined as a region excluding a region where windows, etc. in the outward appearance of the building are aligned in a consistent pattern. For example, by referring to FIG. 3, there are a region where the building's windows are aligned in a consistent pattern (i.e., a wall region) and a region of stores with various signboards (i.e., a local region) in the building A displayed two dimensionally in the queried image. In the case, the local area included in the building A may be a region 320 including the region of stores. The local region matching part 240 may match the local region 320 in the queried image with a local region 420 in the panoramic image 400. The local region may represent either only one region included in the building or multiple regions included therein.

In accordance with an example embodiment of the present invention, the local region may include a recognizable string (e.g., text) or figure (e.g., logo), according to which, if there exists a local region including the string or the figure in the specific building in the queried image, whether the string or the figure is matched with that in the local region of the building(s) in the candidate panoramic image(s) may be focused on, and therefore the recognition rate of the building may be increased.

In accordance with an example embodiment of the present invention, the matching result providing part 260 may conduct a function of selecting top n candidate panoramic images which have been determined to have top n degrees of matching accuracy as final retrieval results based on the result of matching performed by the local region matching part 240 and offering information on the top n candidate panoramic images to the user terminal 300.

In accordance with an example embodiment of the present invention, the supplementary matching part 250 may carry out a function of enhancing the degree of matching accuracy by further referring to additional information relating to the specific building. If the degree of visibility of the specific building included in the queried image is determined to be lower than a certain threshold, the supplementary matching part 250 may raise the degree of matching accuracy by using the additional information.

In accordance with an example embodiment of the present invention, examples of the additional information may include information on color distribution of at least one local region included in the building, information on a wall(s) of another building(s) adjacent to the building, information on a local region(s) of another building(s) adjacent to the building, location information acquired from a global positioning system communicating with the user terminal where the specific building image is inputted as a query, etc.

For instance, by referring to FIGS. 3 and 4B, to enhance the degree of matching accuracy in a matching for the building A inputted as a query, it may be possible to match the wall 330 and the local region 340 of the building B adjacent to the building A with the wall 430 and the local region 440 of the building D adjacent to the building C in the panoramic image.

As mentioned in the present invention, the panoramic image database 271 and the building database 272 in the present invention are concepts of databases not only in a narrow meaning but also in a broad meaning which include data records, etc. based on computer file systems. From the aspect, it must be understood that, even a set of simple operation processing logs may be the database(s) in the present invention if data can be extracted from the set.

In accordance with an example embodiment of the present invention, the communication part 280 may perform a function of instructing the building image matching system 200 to communicate with an external device such as the user terminal 300.

In accordance with an example embodiment of the present invention, the control part 290, besides, may perform a function of controlling data flow among the stereo matching part 210, the building alignment matching part 220, the building wall matching part 230, the local region matching part 240, the supplementary matching part 250, the matching result providing part 260, the database managing part 270 and the communication part 280. Briefly, the control part 290 may control the flow of data from outside or among the components of the image matching system 200 and allow the stereo matching part 210, the building alignment matching part 220, the building wall matching part 230, the local region matching part 240, the supplementary matching part 250, the matching result providing part 260, the database managing part 270 and the communication part 280 to perform their unique functions.

In accordance with the present invention, it is possible to retrieve and provide a panoramic image(s) including an image of the actual building identical to the specific building in the queried image by (i) matching between the outward appearances of the buildings, such as their walls and (ii) matching between their local regions.

Furthermore, in accordance with the present invention, it is possible to dramatically increase the degree of matching accuracy by using additional information, such as information on alignment(s) and color(s) of a signboard(s) in the local region, information on the wall(s) and the local region(s) of its adjacent building(s) and location information acquired from the GPS.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for hierarchically matching a building image, comprising:
    designating a building adjacent to be included in a specific building group if the adjacent building is next to a specific building in a building image inputted as a query and a distance between the adjacent building and the specific building is less than a certain distance;
    matching the alignments of the buildings in the specific building group with those in a group of buildings included respectively in at least one panoramic image;
    selecting a panoramic image that includes a certain group of buildings recognized to have the same or similar alignments to the buildings in the specific building group among the at least one panoramic image as the result of matching the alignments of the buildings;
    matching a wall of the specific building with a wall of a building in the at least one panoramic image based on physical parameters of the wall by using a technology of matching a building's shape or repeated pattern;
    selecting a candidate panoramic image which includes a building recognized to have the same or similar wall to the specific building in the building image as a result of matching its wall with others;
    matching at least one local region, if containing a recognizable string or figure, in the specific building with a local region in the building of the candidate panoramic image by using a technology of recognizing a string or a figure; and
    determining a top panoramic image with a top degree of matching accuracy in the candidate panoramic image as the result of matching the local region.

2. The method of claim 1, wherein the building in the panoramic image is three-dimensionally reconstructed by using a stereo matching technique and the matching processes for the building's wall and the local region are performed by referring to the three-dimensionally reconstructed information.

3. The method of claim 2, wherein the three-dimensionally reconstructed information by using the stereo matching technique is stored in a database.

4. The method of claim 1, wherein the matching process for the alignments of buildings included in the groups of buildings is performed by referring to the information on the reconstructed buildings included in the groups of buildings in the panoramic image in use of the stereo matching technique.

5. The method of claim 1, wherein the matching process for the wall includes a matching process for at least one of the building's boundary, its wall's shape, form, color, window alignment and window pieces.

6. The method of claim 1, wherein the local region includes at least one signboard.

7. The method of claim 1, further comprising the step of providing the top n panoramic image with the top n degree of matching accuracy as the result for retrieving the query.

8. The method of claim 1, further comprising the step of referring to additional information to increase the degree of matching accuracy, wherein the additional information includes at least one of information items:
    color distribution of at least one local region in the specific building,
    the wall of a building adjacent to the specific building,
    a local region of the building adjacent to the specific building, and
    a location acquired from a GPS communicating with a user terminal, if the specific building is inputted as the query through the user terminal.

9. A system for hierarchically matching a building image, comprising:
    a building alignment matching part for designating a building adjacent to be included in a specific building group if the adjacent building is next to a specific building in a building image inputted as a query and a distance between the adjacent building and the specific building is less than a certain distance, matching the alignments of the buildings in the specific building group with those in a group of buildings included respectively in at least one panoramic image and selecting a panoramic image that includes a certain group of buildings recognized to have the same or similar alignments to the buildings in the specific building group among the at least one panoramic image as the result of matching the alignments of the buildings;
    a building wall matching part for matching a wall of the specific building with a wall of a building in at least one panoramic image based on physical parameters of the wall by using a technology of matching a building's shape or repeated pattern and selecting a candidate panoramic image which includes a building recognized to have the same or similar wall to the specific building in the building image as a result of matching its walls with others;

a local region matching part for matching at least one local region, if containing a recognizable string or figure, in the specific building with the local region in the building of the candidate panoramic image by using a technology of recognizing a string or a figure; and a matching result providing part for determining top panoramic image with the top degree of matching accuracy in the candidate panoramic image as the result of matching the local region.

10. The system of claim 9, further comprising a stereo matching part for reconstructing the building included in the panoramic image by using a stereo matching technique, wherein the building wall matching part and the local region matching part perform the matching processes for the building's wall and the local region by referring to information on the reconstructed building by using the stereo matching technique.

11. The system of claim 10, further comprising a database for storing the information on the reconstructed building by using the stereo matching technique.

12. The system of claim 9, further comprising a stereo matching part for reconstructing the group of buildings included in the panoramic image by using the stereo matching technique, wherein the building alignment matching part performs the matching process for alignments of buildings included in the group of buildings by referring to the information on the reconstructed group of buildings in use of the stereo matching technique.

13. The system of claim 9, wherein the building wall matching part performs the matching process for the wall by matching at least one of the building's boundary, its wall's shape, form, color, window alignment and window pieces.

14. The system of claim 9, wherein the local region matching part performs matching for at least one signboard included in the local region.

15. The system of claim 9, further comprising a matching result providing part for providing the top n panoramic image with the top n degree of matching accuracy as the result for retrieving the query.

16. The system of claim 9, further comprising a supplementary matching part for referring to additional information to increase the degree of matching accuracy, wherein the additional information includes at least one of information items:

color distribution of at least one local region in the specific building, the wall of a building adjacent to the specific building, a local region of the building adjacent to the specific building, and a location acquired from a GPS communicating with a user terminal, if the specific building is inputted as the query in the user terminal.

17. A non-transitory medium recording a computer readable program.

* * * * *